United States Patent
Hughes et al.

(10) Patent No.: US 11,740,356 B2
(45) Date of Patent: Aug. 29, 2023

(54) DUAL-OPTICAL DISPLACEMENT SENSOR ALIGNMENT USING KNIFE EDGES

(71) Applicant: Honeywell International Inc., Morris Plains, NJ (US)

(72) Inventors: Michael Kon Yew Hughes, Vancouver (CA); Sudhir Thalore, Surrey (CA); Ian Charles Baron, North Vancouver (CA); Mayank Kalra, Burnaby (CA); Tal Katz, New Westminster (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 217 days.

(21) Appl. No.: 17/229,537

(22) Filed: Apr. 13, 2021

(65) Prior Publication Data

US 2021/0382173 A1 Dec. 9, 2021

Related U.S. Application Data

(60) Provisional application No. 63/035,371, filed on Jun. 5, 2020.

(51) Int. Cl.
*G01S 17/48* (2006.01)
*G01B 9/02* (2022.01)
(Continued)

(52) U.S. Cl.
CPC .......... *G01S 17/48* (2013.01); *G01B 9/02036* (2013.01); *G01B 11/27* (2013.01); *G01S 7/4817* (2013.01); *G01S 7/4972* (2013.01)

(58) Field of Classification Search
CPC ...... G01S 17/48; G01S 7/4817; G01S 7/4972; G01B 9/02036; G01B 11/27;
(Continued)

(56) References Cited

U.S. PATENT DOCUMENTS 5,078,491 A 1/1992 Johnston, Jr.
5,714,763 A 2/1998 Chase et al.
(Continued)

FOREIGN PATENT DOCUMENTS

CN 106873638 B 6/2017
EP 0469880 B1 6/1997
(Continued)

OTHER PUBLICATIONS

Extended European Search Report dated Oct. 7, 2021; issued in connection with European Patent Application No. 21176385.9 (5 pages total).
(Continued)

*Primary Examiner* — Mohamed K Amara
(74) *Attorney, Agent, or Firm* — John Maldjian; Stevens & Lee PC

(57) ABSTRACT

A dual-optical displacement sensor system includes a scanner including a first and second scanner head including optical displacement sensors providing a first and second beam having a first optical axis (OA) and a second OA. A computing device or programmed circuit is coupled to receive time versus position data from measurements involving alignment target(s) including at least one knife edge pair including a first and second knife edge oriented in a first plane of the alignment target that is essentially perpendicular to the OAs positioned between the scanner heads for interacting with the beams, and implement at least one equation to analyze the data for determining a degree of alignment of the first and second OA. Using the degree of alignment, an algorithm is for automatic alignment of the OAs or assist instructions for a user alignment of the OAs that provides guiding steps for the user for the alignment.

20 Claims, 10 Drawing Sheets

(51) Int. Cl.
  *G01B 11/27* (2006.01)
  *G01S 7/481* (2006.01)
  *G01S 7/497* (2006.01)

(58) Field of Classification Search
  CPC ........... G01B 11/0608; G01B 21/08; G01B 2210/44; G01B 11/272; G01B 11/02; G01B 11/06
  See application file for complete search history.

(56) References Cited

U.S. PATENT DOCUMENTS

| | | | |
|---|---|---|---|
| 6,281,679 B1 | 8/2001 | King et al. | |
| 7,528,400 B2 | 5/2009 | Duck et al. | |
| 7,764,385 B1* | 7/2010 | Dey | G01B 11/27 |
| | | | 356/508 |
| 2006/0062351 A1* | 3/2006 | Yokhin | G01N 23/20008 |
| | | | 378/86 |
| 2006/0160250 A1* | 7/2006 | Bonassar | B29C 64/118 |
| | | | 438/1 |
| 2007/0057204 A1* | 3/2007 | Kruit | H01J 37/3045 |
| | | | 250/492.23 |
| 2007/0082459 A1* | 4/2007 | Faris | C12Q 1/6825 |
| | | | 438/455 |
| 2009/0056156 A1 | 3/2009 | Hellstrom et al. | |
| 2009/0304150 A1* | 12/2009 | Metzler | G01T 1/1648 |
| | | | 378/150 |
| 2012/0170052 A1* | 7/2012 | Kuo | G01B 11/24 |
| | | | 356/601 |
| 2012/0293810 A1* | 11/2012 | Meijer | B82Y 10/00 |
| | | | 356/623 |
| 2016/0178514 A1* | 6/2016 | Li | G02B 21/0016 |
| | | | 356/630 |
| 2017/0122729 A1* | 5/2017 | Tarbutton | G01B 11/002 |
| 2018/0106595 A1* | 4/2018 | Christoph | H04N 23/50 |
| 2019/0360796 A1 | 11/2019 | Fujimoto et al. | |

FOREIGN PATENT DOCUMENTS

| | | | | |
|---|---|---|---|---|
| JP | 2599463 Y2 | * | 9/1999 | |
| JP | 2002-533661 A | | 10/2002 | |
| JP | 2006324001 A | * | 11/2006 | ........... G11B 7/094 |
| JP | 3953520 B2 | | 8/2007 | |
| JP | 2010-020025 A | | 1/2010 | |
| JP | 2015169546 A | | 9/2015 | |
| JP | 2017111121 A | * | 6/2017 | ........... G01N 21/01 |
| KR | 20160093623 A | * | 10/2016 | ........... G02F 1/1341 |

OTHER PUBLICATIONS

Notice of Reasons for Refusal dated May 25, 2022; issued in connection with corresponding Japanese Patent Application No. 2021-094308 with English language translation (8 pages total).

* cited by examiner

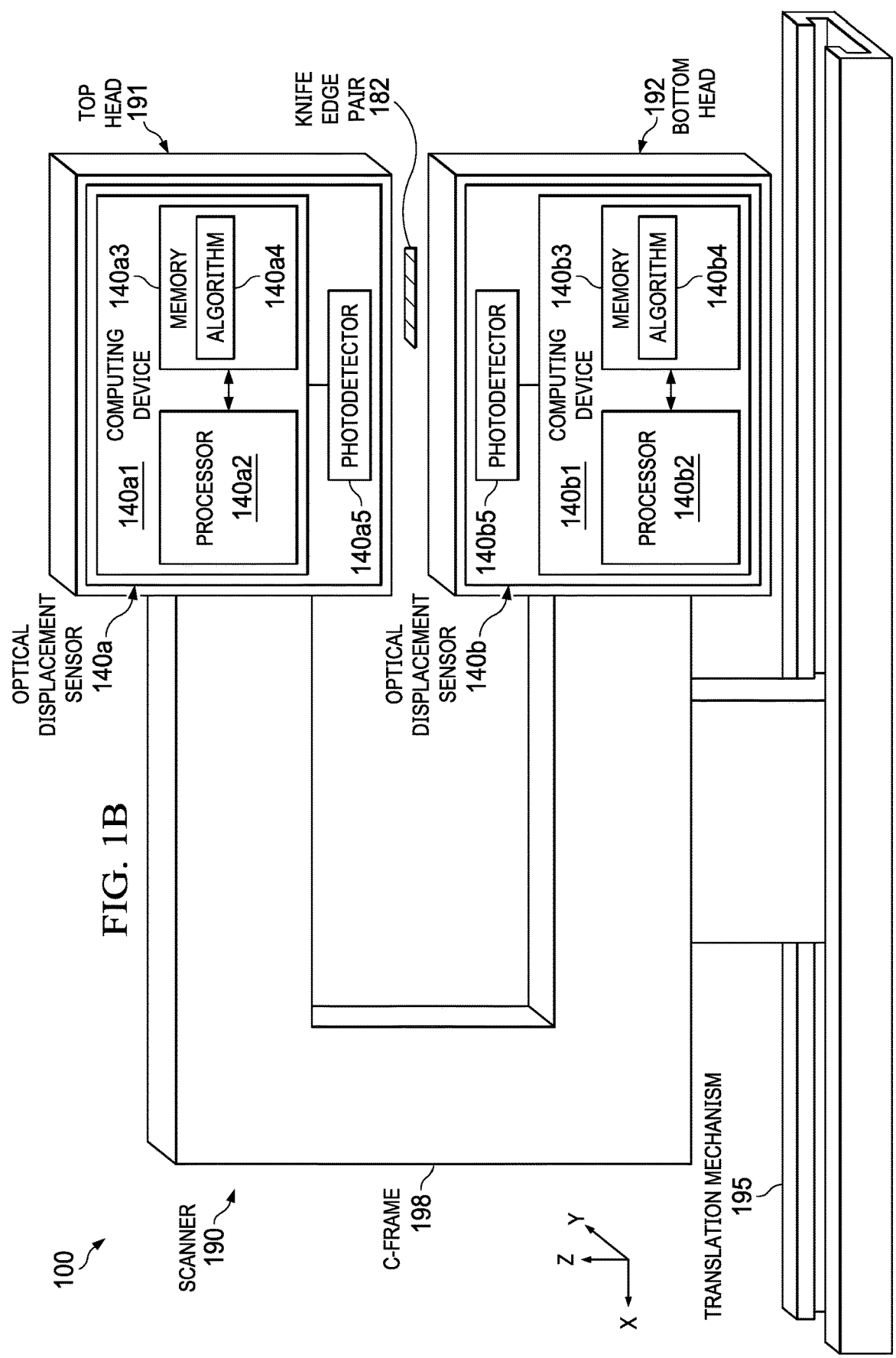

DUAL-OPTICAL DISPLACEMENT SENSOR ALIGNMENT USING KNIFE EDGES

CROSS-REFERENCE TO RELATED APPLICATIONS

This application claims the benefit of Provisional Application No. 63/035,371 entitled "DUAL-OPTICAL DISPLACEMENT SENSOR ALIGNMENT USING KNIFE EDGES", filed Jun. 5, 2020, which is herein incorporated by reference in its entirety.

FIELD

This Disclosure relates to the alignment of the axes of focused light referred to herein as a beam, that are transmitted from the respective scanner heads of a dual-optical displacement sensor system.

BACKGROUND

Lithium-ion batteries utilize a coated sheet material for the anode and cathode electrodes. The process of manufacturing lithium-ion batteries generally begins with an electrode manufacturing process comprising mixing an electrochemical slurry comprising a graphite compound for the anode, and a lithium-metal-oxide compound for the cathode which acts as an electron collector during the ion flow within the battery cell. This slurry is then spread evenly onto metallic foils as the sheet material (or substrate) to form the electrodes, commonly through a process generally called slot die coating. For lithium-ion batteries, the sheet material generally comprises a copper foil for the anode and an aluminum foil for the cathode.

After the metal foil has been evenly coated with the slurry on one or both of its sides, it is put into an oven to dry the slurry. Once the anode and cathode have been dried to form electrodes, each electrode is compressed to a desired thickness between calender rolls. The thickness of these electrodes may be 100 µm to 300 µm or more. To form a battery, a separator is placed between the anode and cathode inside a metal container, an electrolyte is then added, and finally the anode and cathode are electrically connected to leads. As a part of process control for the electrode manufacturing process, accurate thickness measurements for the coating are needed for both the anode and for the cathode.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize known non-contact thickness (or caliper) measurement is typically provided by a dual-optical displacement sensor system comprising a scanner including top and bottom scanner heads (heads) that each include optical displacement sensors, where the heads are positioned on opposite sides of a coated sheet material that is sometimes referred to as a 'web product'. During the thickness measuring process, the scanner is moved relative to the sample of sheet material being measured, generally moving the scanner in one direction referred to as a machine direction, while the heads are moved in a direction perpendicular to the machine direction referred to as the cross direction. The optical axes (OA) of the respective beams transmitted out from the heads need to be as co-linear as possible to minimize thickness measurement errors. Thickness measurement errors can result from lack of co-linearity resulting from the angle of the OAs relative to the area dimension of the coated sheet material being different, and from the respective optical displacement sensors measuring different positions (areas) on opposite sides of the coated sheet material.

There are also difficulties in first aligning the heads to align their respective OAs, and secondly after aligning the OAs there can be difficulties in determining whether mechanical forces (such as induced by temperature changes) have affected the alignment. Some optical device manufacturers provide software and hardware alignment tools for performing this alignment. However, these known alignment tools are generally not sufficiently accurate for some thickness measurement applications, where the alignment of the OAs of the respective beams may be no better than 50 µm.

Disclosed aspects include a method of dual-optical sensor system alignment that enables high-accuracy thickness measurements for a coated sheet material, such as commonly used for the process control in the manufacturing of electrodes in the lithium-ion battery electrode market. As noted above, for lithium-ion batteries the electrodes comprise a coated sheet material comprising an electrode coating on at least one side of a sheet material that is generally a metal foil.

Disclosed beam alignment systems, methods and disclosed dual-optical displacement sensor systems solve the problem of not knowing whether the OA of respective beams transmitted out from the top and bottom heads positioned on opposite sides of a coated sheet material are properly aligned while the dual-optical displacement system is scanning. Disclosed beam alignment systems include the following:

1) At least one alignment target providing four knife edges including at least one knife edge pair that includes a first knife edge and a second knife edge. The knife edge pair(s) are oriented in a plane of the alignment target that is essentially perpendicular to the first and the second OA positioned between the heads for obtaining time versus position data. Essentially perpendicular as used herein means 90° plus or minus 10°, typically being at an angle of 90° plus or minus 3°. The alignment target is for obtaining data that enables determining a degree of alignment of the first OA relative to the second OA to enable aligning the OAs. Also, disclosed beam alignment systems can be optionally used for also periodically and automatically testing for proper beam alignment to permit adjusting the alignment of the OAs when realignment is determined to be needed.

2) An automated beam alignment process for a scanning dual-optical sensor system. A computer system can be programmed (e.g., with firmware or software) to provide instructions that enable a user of a scanning dual-optical displacement sensor system to complete a disclosed beam alignment process. By being able to accurately measure and continuously record the relative beam alignment, and use the relative beam alignment for realignment, a major source of error for the thickness measurement provided by a dual-optical displacement sensor system can be removed.

Regarding beam realignment, once the beam alignment data is generated, one can move the angle and generally also the x and y positions of generally one of the heads with respect to the other head As used herein, the heads are considered to be spaced apart in the z-direction, which is also the intended direction of the OAs. To achieve disclosed OA alignment, it may be mechanically best to move one head in the x direction and move the other head in the y direction. There is thus generally no need to move both heads for achieving disclosed OA alignment. The lens(es) within the head(s), rather than the head(s), may also be adjusted for achieving disclosed beam alignment.

BRIEF DESCRIPTION OF THE DRAWINGS

FIG. 1B shows a more detailed view of the dual-optical displacement sensor system showing the scanner including the top head and a bottom head, and a translation mechanism shown as a translation stage configured for scanning the C-frame.

DETAILED DESCRIPTION

Figure 1A:
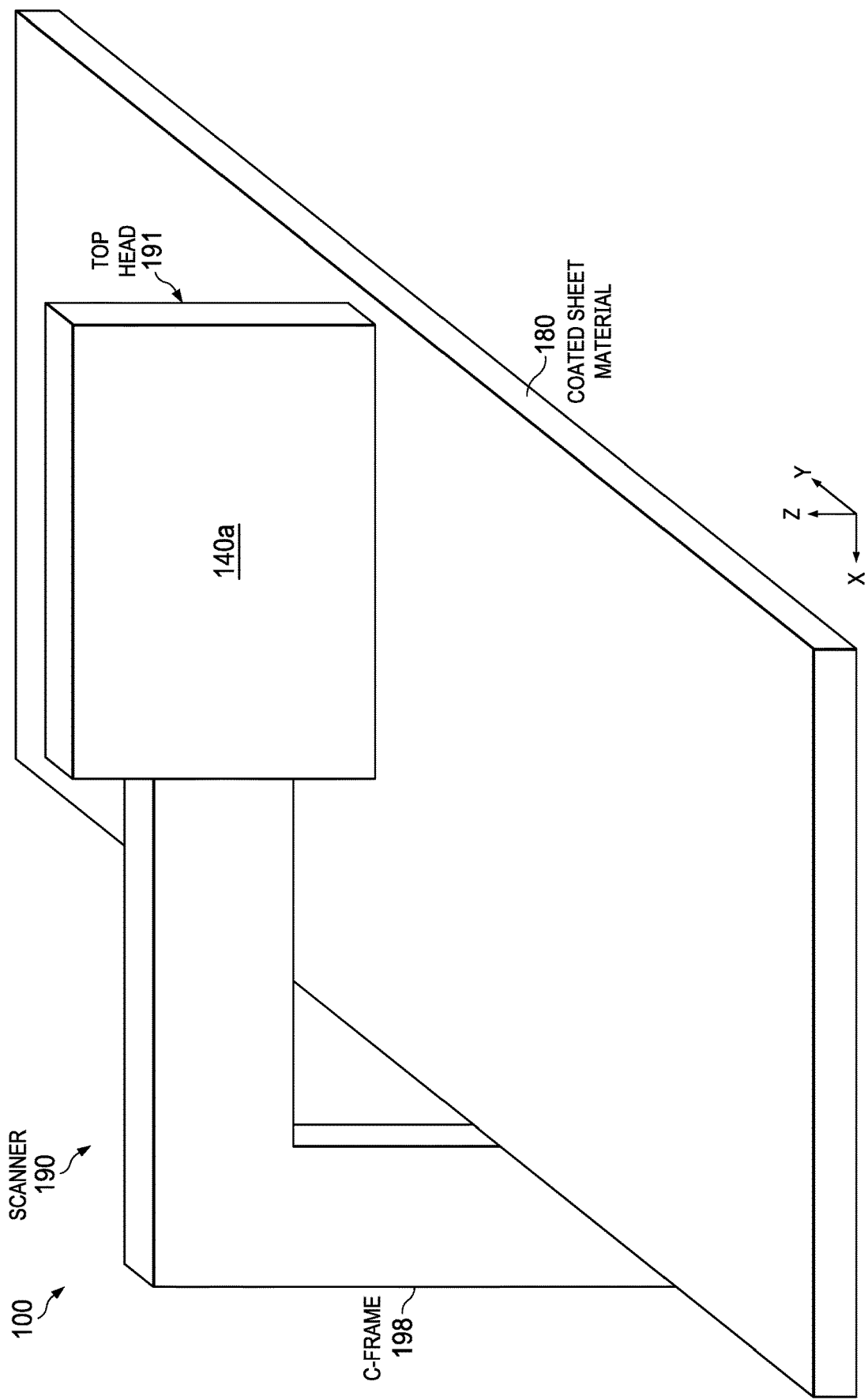
FIG. 1A shows a top perspective view of an example dual-optical displacement sensor system for measuring the thickness of a coated sheet material that comprises a scanner including a translation mechanism (a translation mechanism is shown as a translation stage in FIG. 1B).

Disclosed aspects are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the aspects disclosed herein.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

As known in the art a 'laser triangulation sensor' comprises a laser light source and a photodetector. The laser beam is projected on the target and the reflected signal is detected by a photodetector, usually being a Charge Coupled Device (CCD), complementary metal oxide semiconductor (CMOS) or a Position Sensing Detector (PSD). In the case of a chromatic confocal sensor, a light source provides a spectrum (range) of wavelengths, or there is a monochromatic light source such as a light-emitting diode (LED) or laser diode in the sensor, where polychromatic or 'white' light is generated by converting the narrow spectrum light from the monochromatic light source generally with phosphors, where there can be more than one LED or laser diode. The polychromatic or white light originates from a small aperture from optics in the head that may be referred to as being a pinhole, or something analogous to a virtual pinhole, such as from the tip of an optical fiber that is projected on the target, where light reflected from the target is detected in reflection mode operation through the same aperture (or from or an optically equivalent aperture) by the photodetector.

In these chromatic confocal sensors, one uses a spectrometer including a photodetector to analyze the measured intensity of light at each wavelength which makes it through the aperture, but uses the spectral (wavelength) information to determine the position of the target. A needed feature for chromatic confocal sensors is that the light goes through a highly chromatically dispersive lens so that each wavelength of light is focused in a narrow range along the OA. When the alignment target is on the focal plane for a particular wavelength, the reflected light intensity at that wavelength becomes maximum. Using this property, the distance to one target can generally be measured accurately (for example, a 0.01 micrometer resolution at a target distance of 6 mm for a sensor).

FIG. 1A shows a top perspective view of a sensor system 100 for measuring the thickness of a coated sheet material 180 that further comprises a scanner 190 shown as a C-frame 198 including a translation mechanism (see the translation mechanism 195 in FIG. 1B described below). Alternatively, the C-frame shown can also be an O-frame. The optical displacement sensor 140a is contained within a head shown as a top head 191 of the scanner 190.

The optical displacement sensor 140a is part of a dual-optical displacement sensor system, where the optical displacement sensor 140a includes at least one lens (generally a plurality of lenses) for generating a focused beam from light provided by a light source provided by the dual-optical displacement sensor system. The sensor system 100 also includes a photodetector for detecting incident light, and a computing device or a programmed circuit that implements a disclosed OA alignment algorithm using knife edges, where the computing device or the programmed circuit can be located within the scanner 190, or generally be located anywhere in the sensor system 100. Moreover, the photodetectors do not have to be in the heads. for example, the photodetectors can be communicably connected to the heads with a long fiber optic cable.

The optical displacement sensor 140a can comprise a chromatic confocal displacement sensor, or another type of optical displacement sensor, such as a laser triangulation sensor. Although generally described herein using chromatic confocal displacement sensors, this Disclosure enables disclosed aspects to also be practiced with laser triangulation sensors.

FIG. 1B shows a more detailed view of the scanner 190 in the sensor system 100 showing the top head 191 and now also a bottom head 192, as well as a translation mechanism 195 configured for motor driven scanning of the C-frame 198. There are known different ways of moving the C-frame 198 besides what is commonly known as a translation mechanism or translation stage. In this arrangement both the top head 191 and the bottom head 192 include an optical displacement sensor shown as optical displacement sensor 140a in the top head 191, and an optical displacement sensor 140b shown in the bottom head 192. The distance between the top head 191 and the bottom head 192 is shown being in the z-direction, which is generally used herein for this distance. A disclosed alignment target 182 is shown in simplified form positioned between the top head 191 and the bottom head 192 near the center of the spacing between the heads in the z-direction.

The optical displacement sensor 140a is shown comprising a photodetector 140a5 that is communicatively connected to a computing device 140a1 that comprises a processor 140a2 and a memory 140a3 that is shown storing a disclosed algorithm 140a4. Similarly, the optical displacement sensor 140b is shown comprising a photodetector 140b5 that is communicatively connected to a computing device 140b1 comprises a processor 140b2 and a memory 140b3 that is shown storing a disclosed algorithm 140b4. As an alternative to the computing device there can also be a programmed circuit, such as a field programmable gate array (FPGA) that is programmed to implement a disclosed algorithm.

Figure 1C:
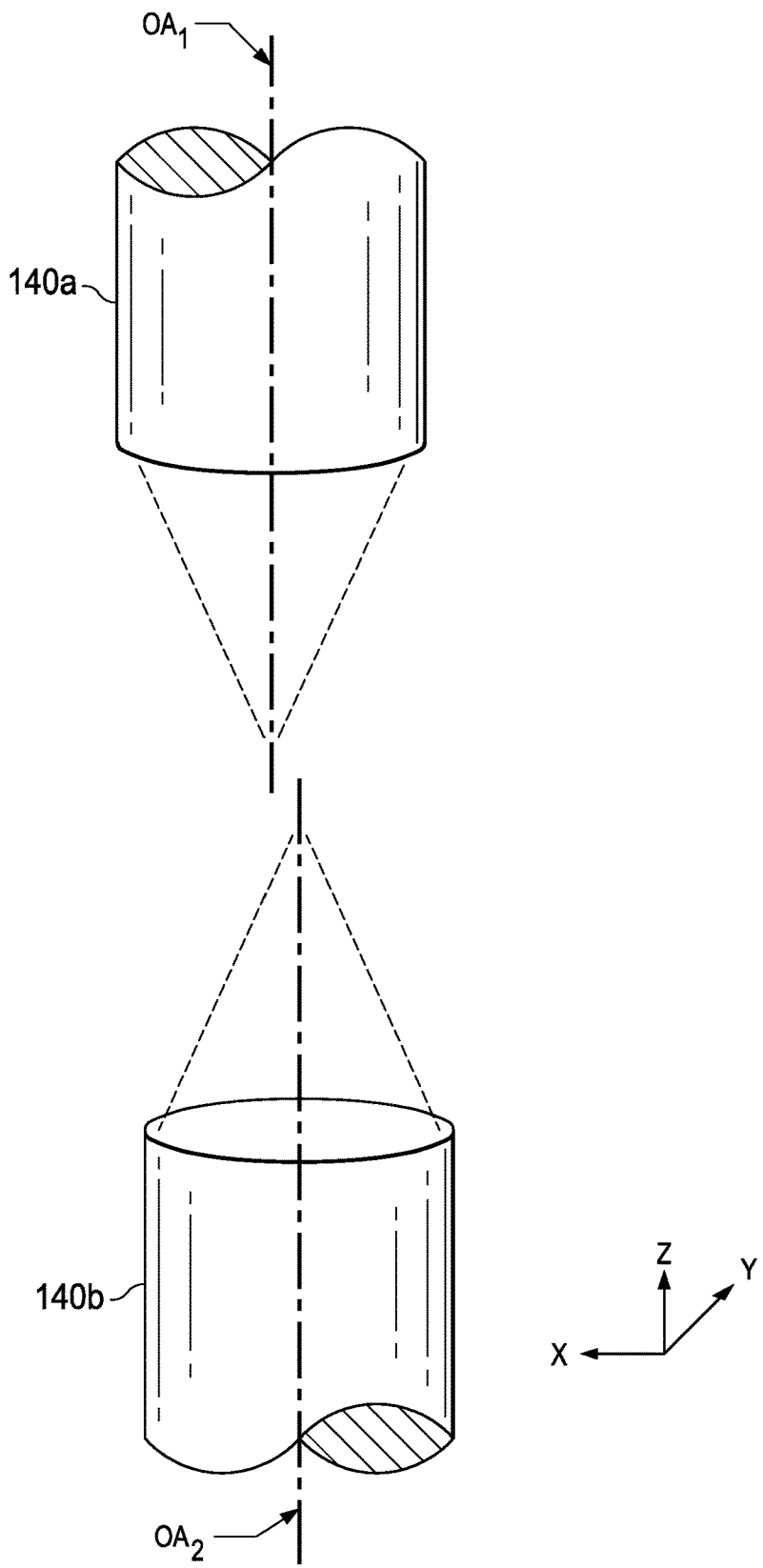
FIG. 1C is a schematic diagram illustrating a situation where the OA of the beams from the optical displacement sensors in the top and the bottom heads are misaligned in position with respect to each other when positioned for measuring a thickness of a sample of coated sheet material.

FIG. 1C is a schematic diagram illustrating a situation where the OA of the beams from the optical displacement sensor 140a in the top head is shown emitting a beam shown as $OA_1$ and the optical displacement sensor 140b in the bottom head is shown emitting a beam shown as $OA_2$ that are misaligned in position with respect to each other when measuring a thickness of a sample of coated sheet material (the coated sheet material will be between the heads, is not shown). The integrated nature of disclosed alignment targets is so that the relative positions of the first and second knife edges of each alignment target are known and stay constant. The alignment targets can be made out of thin rolled metal such as comprising steel, and need not have a mirror-like surface. The pattern to form the alignment targets including the knife edges can be cut out using a water jet, but this is only one example way to fabricate the knife edges for disclosed alignment targets. One can also make all four knife edges (two for the first alignment target and two for the second alignment target) from one piece of material, but it is generally easier to make two pieces, one piece for the first alignment target and a second piece for the second alignment target.

It is now described how to use a disclosed thickness measurement system comprising at least one alignment target including a plurality of knife edges with a scanner such as the scanner 190 shown in FIGS. 1A and 1B. Coated sheet material producers, such as lithium battery producers, will generally always want to know the total caliper (thickness) of the product, such as for electrodes. A double-sided (two heads) optical measurement can provide the thickness measurement of the coated sheet material product. One may use a C-frame 198 for scanning because it is important that the respective OAs of the beams from the first and second optical displacement sensors be well aligned to one another to avoid an error in the thickness measurement. With a C-frame 198, the top head 191 and the bottom head 192 are well aligned to one another, and thus the OA of their respective beams are aligned, because they do not move independently. The whole C-frame 198 scans the area of coated sheet material 180 that is generally the form of a sheet as it is mounted on a translation mechanism 195, such as a translation stage.

To make thickness measurements, one generally needs to know the distance shown in the z-direction between the top head 191 and the bottom head 192. This distance determination can be performed with a mechanical design and periodic standardization against a known-thickness reference standardization 'tile', or it can be measured (if one has a less-stiff frame) with a magnetic z-sensor such as Hall-effect sensor, giant-magnetoresistance (GMR) sensor, or fluxgate sensor, also with periodic standardization. With a less stiff frame, even if it is essentially infinitely stiff, thermal expansion/contraction can change the separation distance between the heads.

Figure 2:
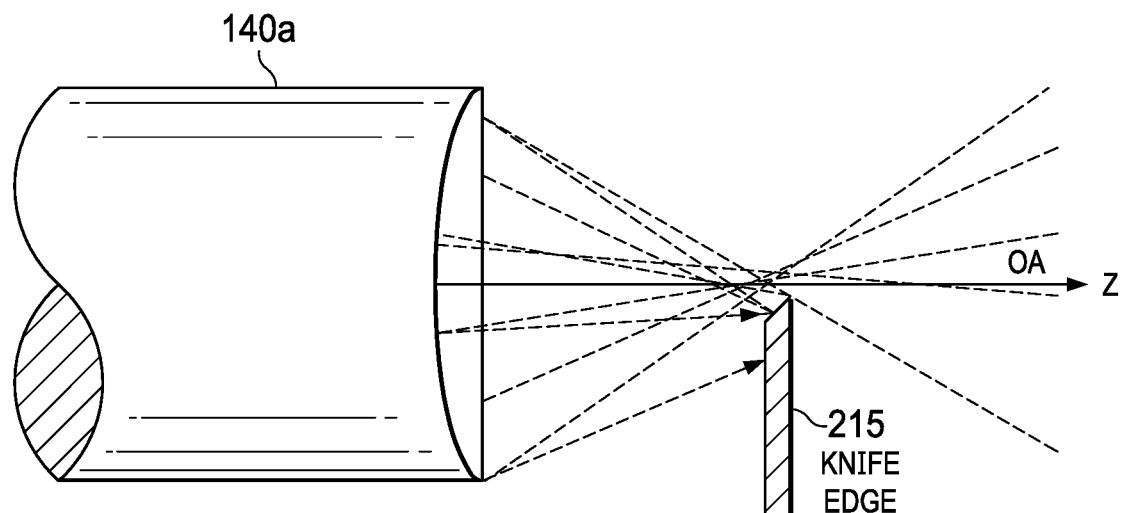
FIG. 2 shows the basic elements for a knife edge test comprising a knife edge together with a spectrometer shown as a top head including an optical displacement sensor that demonstrates how the knife edge test works. The beam portions to the right of the knife edge are not detected and thus not seen by the optical displacement sensor (or a spectrometer), which only detects light from the beam that is reflected by the knife edge back to the top head. The light preferentially reflected back to the optical displacement sensor is from the plane of the alignment target that includes the lines of the knife edges.

FIG. 2 shows the basic elements for a single knife edge test for the determination of an OA of a beam of light. These basic elements comprise a knife edge 215 together with spectrometer shown as an optical displacement sensor 140a described above being in the top head that demonstrates how the knife edge test works. The beam portions to the right of the knife edge 215 are not detected, and thus not seen by the optical displacement sensor 140a (or a spectrometer in the position of the optical displacement sensor 140a), which only detects light from the beam that is reflected by the knife edge 215 back to the top head. The light preferentially reflected back to the optical displacement sensor 140a is in the plane of the alignment target including the line defined by the knife edge 215.

By monitoring the intensity of the reflected light after being affected by the knife edge 215 on a photodetector within the top head, or the intensity of the transmitted light after being affected by the knife edge 215 by a photodetector on the right side of the knife edge 215 opposite the top head, one can obtain time versus position data to enable determining the center of the focal position.

For a chromatic confocal displacement sensor, as described above the polychromatic beam of light is focused along the OA, but its different wavelengths are focused at different positions along the OA. Generally, the more red light (the longer wavelengths) will be focused by the lenses in the head before (closer to the lens) as compared to the more blue light (the shorter wavelengths). A line defining the respective focal positions at the different positions will be on the OA, and this line should be a straight line.

To enable a dual-optical displacement sensor system to make accurate thickness measurements for a coated sheet material, two optical displacement sensor measurements, such as from first and second chromatic confocal measurements, are needed. As described above, it is also possible to perform thickness measurements for a coated sheet material with first and second laser triangulation sensors as well, but this description uses first and second chromatic confocal sensors only as an example. To generally obtain the best dual-optical displacement sensor system thickness measurement accuracy, it is necessary that OAs of the beams from the two heads shown in FIG. 3A as top head 191 and bottom head 192 are co-linear as shown by the single OA 325, with FIG. 3A further described below.

The method generally includes steps to mitigate cross talk between the first and the second head. When collecting time versus position data, at a first time the first beam from the first optical displacement sensor is controlled to be on while the second beam from the second optical displacement sensor is controlled to be off. At a second time the second beam from the second optical displacement sensor is controlled to be on while the first beam from the first optical displacement sensor is controlled to be off. Without crosstalk mitigation measures, the second head will see the light from the first head and vice versa, resulting in an error resulting from the crosstalk. One method to essentially eliminate crosstalk between the heads is to pulse both of the light sources so that they operate out of phase with each other, so that at one point in time, the light source and detector of the first optical displacement sensor are on and the light source and detector of the second optical displacement sensor are off, then at a time of ½ a period (T) later, the second optical displacement sensor is on and the first optical displacement sensor is off.

Figure 3A:
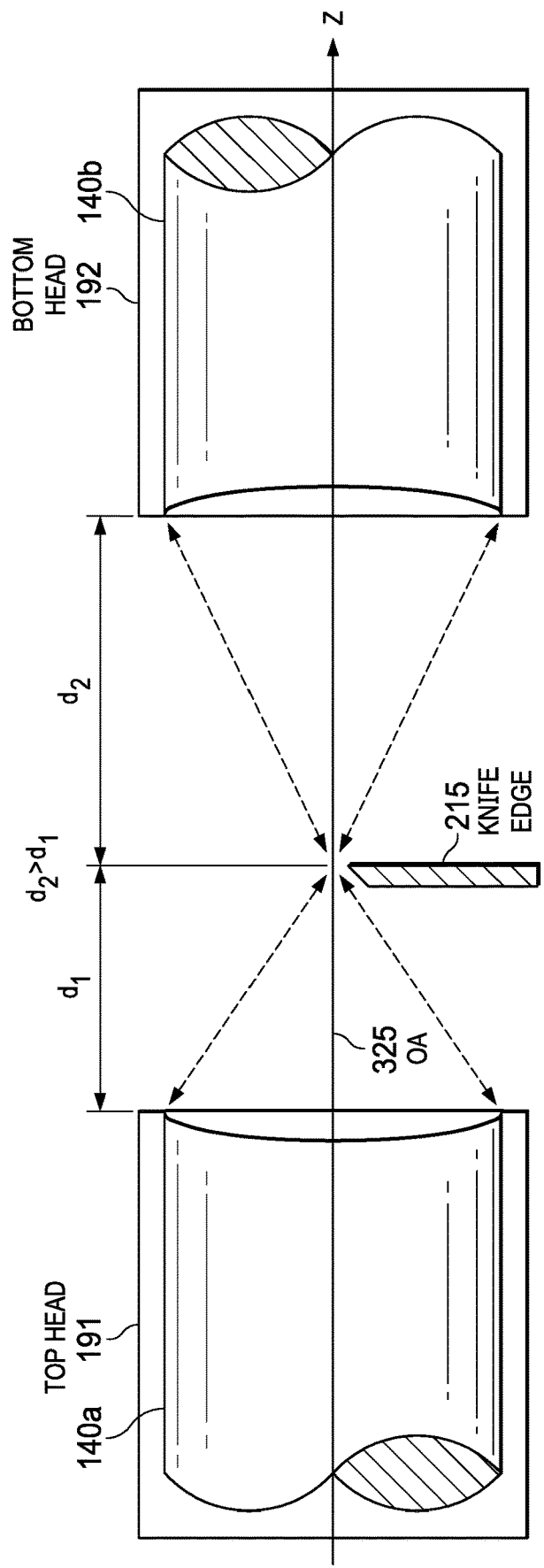
FIG. 3A shows a first and a second head shown as a top head and a bottom head, that together are configured for making respective measurements to enable a thickness measurement(s) for a coated sheet material. A knife edge is shown positioned closer to the top head shown as $d_1$ as compared to the distance to the bottom head shown as $d_2$.

FIG. 3A shows a first and a second chromatic confocal head again shown as top head 191 including an optical displacement sensor 140a and bottom head 192 including an optical displacement sensor 140b, that are together configured for making respective measurements to enable a thickness measurement(s) for a coated sheet material. A knife edge 215 is shown positioned closer to confocal top head 191 shown as $d_1$ as compared to the distance to the bottom head 192 shown as $d_2$. To obtain the best thickness measurement accuracy for the coated sheet material, it is needed for the OAs of the beams transmitted by the respective heads 191, 192 to be co-linear, which is enabled by a disclosed optical alignment system that comprises at least a first alignment target comprising a plurality of the knife edges 215. To accomplish measurements for enabling rendering the OA of the beams co-linear, one needs to position the alignment targets associated with the knife edge pairs in two different parallel planes (not necessarily positioned at the same time so that one knife edge pair may be used) that are each essentially perpendicular to the OAs, such as shown in FIG. 4B described below.

Four knife edges are generally used to determine head misalignment, so that any additional knife edges beyond four will generally be providing redundant alignment information. As noted above, the knife edges need not be configured to provide specular reflection of the beams. In disclosed aspects, the knife edges interact with only one of the beams at a given time when the head is over the knife edge. Performing measurements with one head at a time is recognized to avoid being interference effects. However, the method can comprise the beam pulsing, with the measurements rapidly alternating between the two heads being utilized.

Regarding the interaction between a knife edge and a beam, a knife edge placed between the heads is used to determine the point in the middle of the focal spot of the beam which corresponds to where half the intensity of the beam is reflected back. Although the alignment targets having the knife edges can be moved (in the xy plane and/or in the z-direction/OA) relative to the heads, the heads are generally described herein as being moved relative to the knife edges, where the alignment target(s) may be held in a holder that may be termed a 'tile holder'. Although described generally herein using reflection, disclosed aspects may also be practiced using transmission.

Generally, any sharp straight edge can be used for the knife edges for disclosed alignment targets. The knife edges should be thin so that the reflection at the same z position (the thickness direction for the coated sheet material) is essentially the same from both sides, meaning providing the same optical effect for beams incident from heads on either side of the alignment target.

Figure 3B:
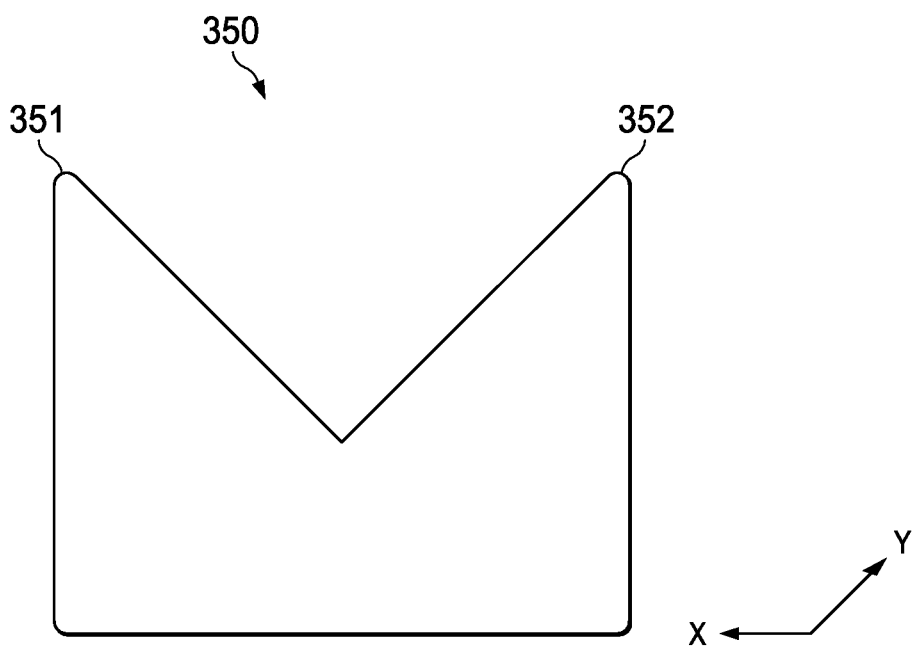
FIG. 3B shows an example alignment target configured as an integrated (one piece) target including a knife edge pair that includes a first knife edge and a second knife edge that are shown at an angle of about 90° relative to one another.

FIG. 3B shows an example alignment target 350 configured as an integrated (one piece) target comprising a knife edge pair that includes a first knife edge 351 and a second knife edge 352, where the knife edges 351, 352 are shown at an angle of about 90° relative to one another, generally being from 50° to 125°, such as being at 80 to 100 degrees relative to one another. The plane of the alignment target is shown oriented in the xy direction (in the plane of the page). Although disclosed systems and methods are generally described utilizing at least one alignment target having first and second knife edge pairs that collectively provide four knife edges, such as a first and a second alignment target each including a knife edge pair including two knife edges (such as shown in FIGS. 4C and 4D described below), one can also reposition a single alignment target (such as alignment target 350) such that the beam traverses the target in a first xy plane, then the alignment target is repositioned and the beam traverses it again in a second xy plane. where the planes of the alignment target are oriented essentially perpendicular to the direction of the OAs to provide the same effect of having four knife edges covering the two different parallel planes. However, as noted above in practice it is generally easier to use first and second alignment targets each having a knife edge pair that includes two knife edges, such as provided by using two of the alignment targets 350 provided at different z distances.

It is also possible when making confocal measurements to use the photodetector to measure the light reflected back from when a disclosed alignment target is placed between the optical displacement sensors. There will be a baseline intensity reading generated corresponding to when there is no alignment target in place, which can be assumed to be zero, and there will be an intensity reading when the alignment target is fully in place between the heads. (see the knife edge intensity measurement data shown in FIG. 5 described below). Although a baseline intensity reading without any alignment target in place is not required, it may be advisable to measure the baseline intensity level-into account to increase the measurement accuracy. The knife edge will be positioned on the OA when the intensity reflected back to the array of photodetectors in the head which measures intensity is halfway between these two intensity values (the measured intensity with and without the alignment target in place between the heads).

As noted above, it is also possible to measure the transmitted intensity with the other head, but that arrangement may be less desirable. An advantage using reflected light back to the same head that provides the beam is that the knife edge is at the focal position (by the confocal position). If one instead uses transmitted light there will generally be a significant background level from the out of focus light. Also, if the other head is not well aligned, one may lose light around the edge of the head. To know that two heads have colinear OAs it is sufficient to know that the knife edge transits the half intensity point at the same place at two positions along the OA.

After aligning the respective heads to one another so that the respective heads are properly aligned, is generally useful to monitor the OA alignment so that one can detect if mechanical forces result in relative movement of the respective heads so that the OAs becoming misaligned. In the case of a misalignment being sensed, this enables sending a prompt alert that scanner maintenance is needed so that the accuracy of thickness measurement provided by the dual-optical displacement sensor system of the coated sheet material is maintained. Therefore, in one arrangement, the dual-optical displacement sensor system is scanned (with its two chromatic confocal heads) over at least one knife edge. Scanning over a single knife edge can be used to detect an alignment change, but to do a full alignment one generally makes disclosed measurements using a first alignment target comprising a first knife edge pair and a second alignment target comprising a second knife edge pair, where the respective alignment targets oriented in different planes that are essentially perpendicular to the OAs, to make a full alignment determination regarding the OAs from the respective heads.

If the alignment targets and thus the lines defined by the knife edge are oriented in a plane that is approximately perpendicular to the OA, such as being at an angle of 85 to 95°, one can determine the relative misalignment of the OAs of the beams in a direction perpendicular to the knife edges and also perpendicular to the OAs. Therefore, at a minimum to confirm beam co-linearity, or to measure relative misalignment of the OA of the respective beams, one needs to pass the beams transmitted from the respective heads over each of the four knife edges, one at a time. Two passes, each with one pass at each of the two knife edge positions can be used. A first pass with the knife edge closer to the head, such as at the closest edge of the measurement range, and a second pass with the knife edge further from the head, such as at the furthest edge of measurement range to provide the maximum distance between the two knife edges can provide a highest angular resolution.

The beam alignment procedure in the case of laser triangulation sensors can be the same as described herein for chromatic confocal displacement sensors. The triangulation device could be used in a mode which monitors the intensity incident on its photodetector which for either technique is not the usual mode of operation.

In one example scanner design, one passes the heads over a tile holder generally comprising a plastic material which can be used for holding disclosed alignment targets and for holding standardization titles. As described above, the primary purpose of the tile holder is hold tiles to enable periodically measurement of the thicknesses of standardization tiles, to confirm an accurate thickness measurement. One can add to the tile holder two pieces made out of thin sheet metal which can function as alignment targets each having a knife edge pair. FIGS. 4B and 4C described below shows first and second alignment targets shown as Target 1 and Target 2 each providing a knife edge pair, along with first and second standardization targets shown as STDZ1 and STDZ2, that are generally all held in place by a single tile holder. Target 1 and Target 2 can each comprise the alignment target 350 shown in FIG. 3B.

One can control movement of the OA(s) by changing the position and/or angle of at least one of the head(s) of a scanner with software, such as software running on circuitry mounted on a printed circuit board assembly (PCBA) that includes a computing device having an associated suitable memory, or a circuit, where the PCBA is generally located inside the scanner. A PCBA is the board obtained after printing solder paste on the PCB and then mounting various components such as resistors, integrated circuits (ICs) including a computing device such as a microprocessor, capacitors and any other components such as transformers, depending on the application and desired characteristics of the board. This software can be connected to the motor encoder that drives the translation mechanism of the scanner. The motor encoder is generally of sufficiently high resolution so that one can command it to move at arbitrarily slow speeds (an encoder count is as small as a few microns). One can then relate the timing to a physical misalignment via the scan speed.

Figure 4A:
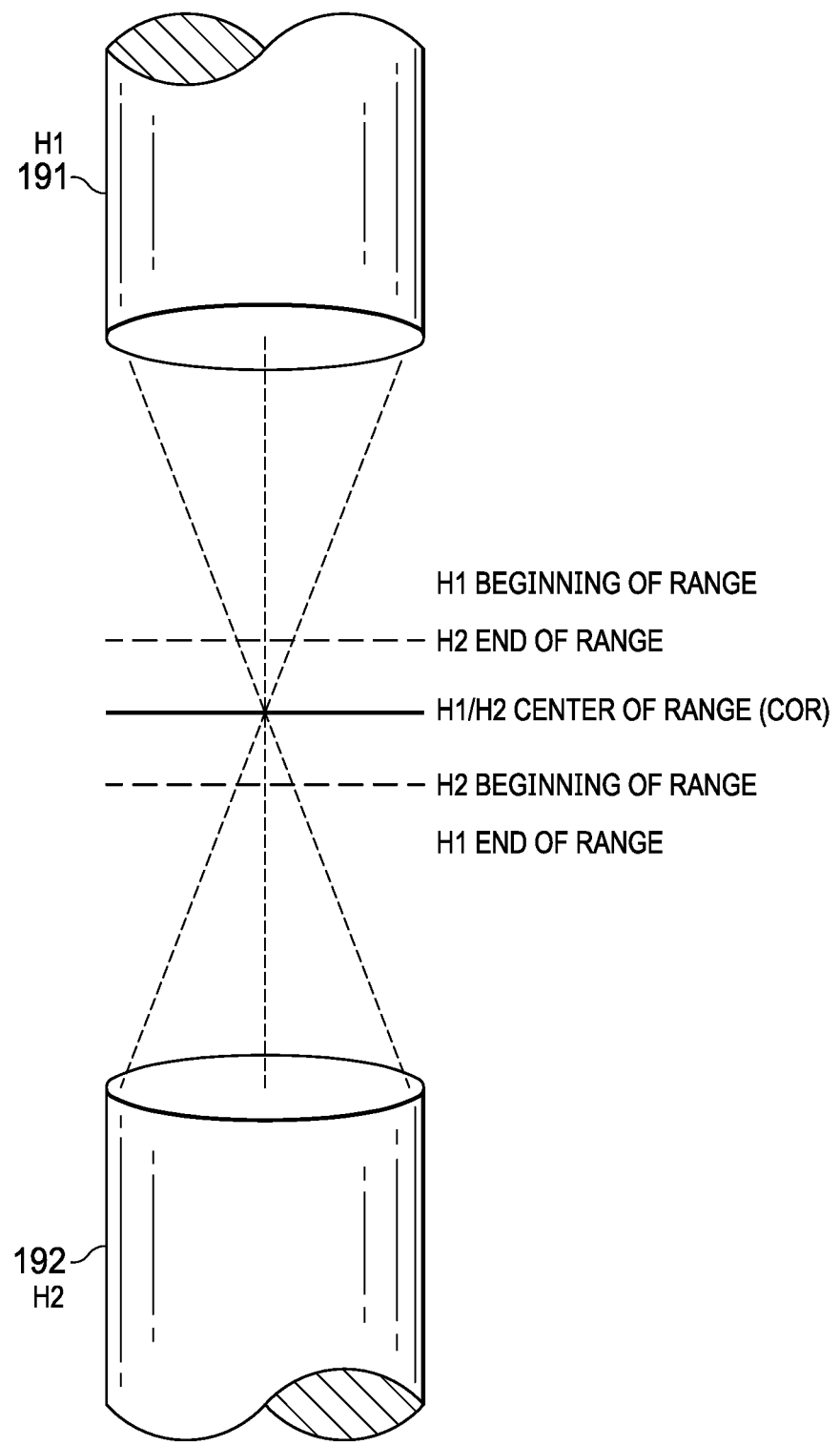
FIG. 4A shows two opposing heads shown as a top head and bottom head with overlapping measurement ranges shown by end of ranges for the respective heads with a center of measurement range shown as the center of range (COR).
Figure 4B:
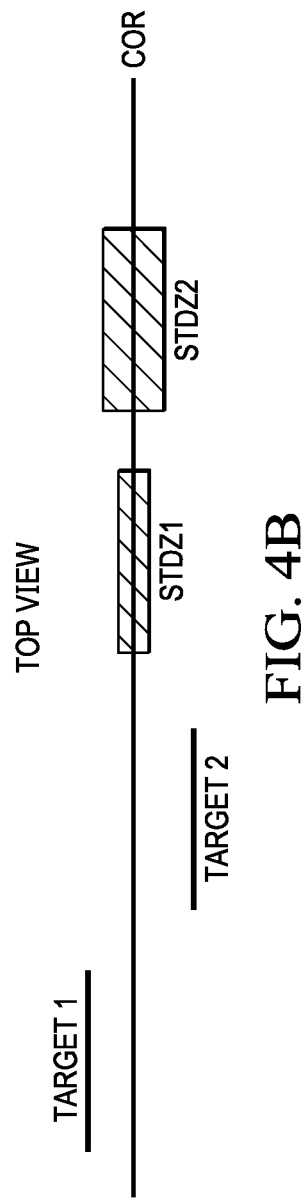
FIG. 4B shows a side view looking along the xy plane at the COR also shown in FIG. 4A with alignment targets now shown as alignment target 1 and alignment target 2, with alignment target 1 above the height of alignment target 2, and also with first and second standardization tiles shown as STDZ1 and STDZ2 shown along the COR.
Figure 4C:
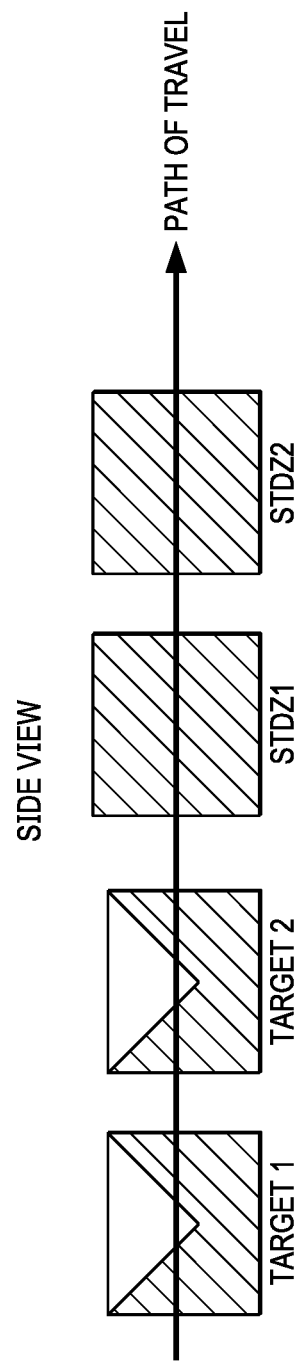
FIG. 4C shows a top view of the same arrangement as shown in FIG. 4B showing that each alignment target (shown as target 1 and target 2) shown in FIG. 4B comprising two knife edges oriented at 90 degrees to one another and 45 degrees relative to the direction of travel of the beams (the OAs).
Figure 4D:
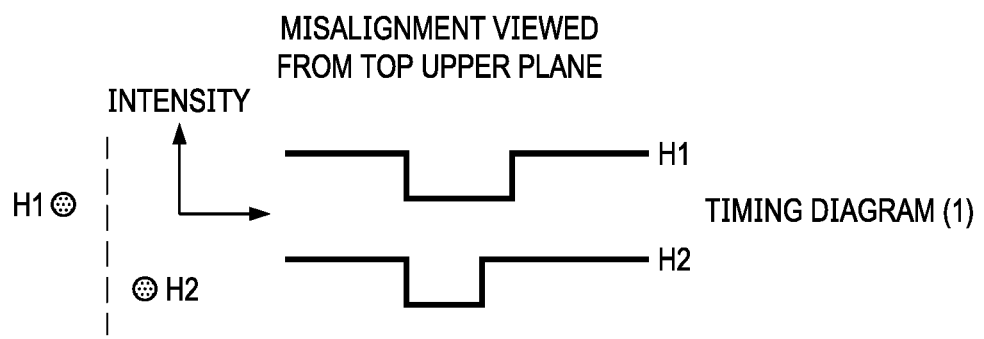
FIG. 4D shows a timing diagram for an example head misalignment in the upper plane shown for the heads $H_1$ and $H_2$ as they traverse over the standardization tiles showing in the y-axis of the diagram the received intensity.

FIG. 4A shows two opposing heads shown as a top head 191 (H1) and bottom head 192 (H2) with overlapping measurement ranges shown by end of ranges for the respective heads 191, 192, with a center of measurement range shown as the H1/H2 center of range (COR). All measurement ranges are at different heights (z-dimension) in same plane that is perpendicular to the plane of the paper as all planes described herein are perpendicular to the sheet (thus oriented along the xy plane) since as noted above the z-axis is along the plane of the paper. Thus, while the three planes for the respective ranges are parallel to each other, as they are at different positions in the z-dimension, so that they are not the same xy plane.

FIG. 4B shows a side view looking along the xy plane at the COR also shown in FIG. 4A with alignment targets now shown as target 1 and target 2, with target 1 shown above the height of target 2, and also with standardization tiles shown as STDZ1 and STDZ2. Target 1 and target 2 can both comprise the alignment target 350 shown in FIG. 3B that comprises a knife edge pair including first and second knife edges oriented at about 90° (such as 80° to 100°, or more generally 50° to 125°) relative to one another, and thus an angle of about 45 degrees relative to the direction of travel of the scanner which is along the OA.

Target 1 is thus shown positioned to be closer to the top head 191 and further from the bottom head 192, while target 2 is positioned further from the top head 191 and closer to the bottom head 192. As noted above, to achieve the maximum angular resolution for the misalignment measurement, one alignment target can be placed at the beginning of the measurement range, and one alignment target can be placed at the end of the measurement range. STDZ1 and STDZ2 are also positioned along the COR, where the STDZ's each have different thicknesses.

Standardization is known to be the process of comparing a thickness measurement to a sample for measurement referred to as a standardization tile having a known thickness value and then adjusting an offset or a slope for a sensor system so that when the standardization tile is remeasured by the sensor system it will read the correct (known) thickness value. Standardization is generally performed periodically, such as for example at every 20 minutes. Before or after one performs standardization is a generally an appropriate time to check for the alignment of the respective OAs. The standardization tiles have a known and consistent thickness across their area, such as comprising a polished metal, or a semiconductor material.

FIG. 4C shows a top view of the same arrangement as in FIG. 4B. In this FIG. each alignment target (shown as Target 1 and Target 2) comprises a knife edge pair including two knife edges oriented at 90 degrees relative to one another and at 45 degrees relative to the direction of travel of the scanner in one dimension shown as the 'path of travel'.

FIG. 4D shows a timing diagram for the example head misalignment in the upper plane shown as the heads 191 and 192 traverse over the alignment tiles for standardization showing in the y-axis of the diagram the received intensity, that for a confocal measurement generally can only be performed using reflection. H1 and H2 shown are the relative head misalignments. The beam alignment perpendicular to the xy plane of the alignment target including the line defined by the knife edge can be determined from the difference in timing (dt) (being the difference in receive times) of the intensity signals that are received by the respective heads 191 and 192 from the equation $dx'=vel \cdot dt/\cos(45 \text{ deg})$, where x' is the direction perpendicular to the point of knife edge so that dx' is a short length in the direction perpendicular to the knife edge, and 'vel' is the scanner velocity (speed). This equation can be generalized if the 45° target angle relative to the OA is changed.

Figure 4E:
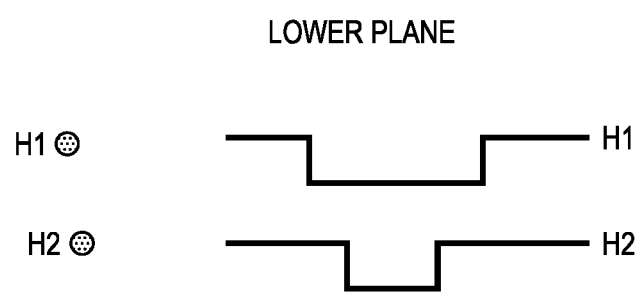
FIG. 4E shows the beam misalignment viewed from the top of $H_1$ and $H_2$ now in the lower plane.

FIG. 4E shows the relative beam misalignment of H1 and H2 now in the lower plane. FIG. 4E has two points with the misalignment which results in that timing diagram.

To perform an initial alignment of the OAs of the beams from respective heads in a dual-optical displacement sensor having a first and a second alignment target each with first and second knife edges one can perform the following example steps:

Scan the heads over all four knife edges to determine the dx'1, dy'1, dx'2, dy'2. Where dx' is a misalignment direction perpendicular to a knife edge in the first direction and dy' is the misalignment in the other direction perpendicular to the first direction, and the subscripts 1 and 2 denote either the upper alignment target or the lower alignment target.

It is recognized that the heads have provisions to both translate in the x and y direction, meaning with respect to the head, not a scanning movement (meaning an in-plane movement relative to the area dimension of the coated sheet material, in this case), and to adjust desired each OA by rotation. To make the adjustment for alignment, one can adjust the position of at least one of the sensor heads. A simple algorithm can be employed to determine alignment positions to guide a user to perform the OA alignment. Generally, this is four-step process.

The scanner can be positioned by a translation stage which is driven by a motor, utilizing an encoder position and the user being directed to adjust the angle or position of one head with at least one alignment target between the heads until a sufficiently high intensity reading is attained, and optionally repeating with the other head. The intensity reading can be conveyed to the user via a graph displayed on a computer screen, such as with a green light indicating a sufficiently good alignment. This can be repeated with the other knife edges if determined to be necessary. This can be repeated iteratively a few times to get even better alignment.

Figure 5:
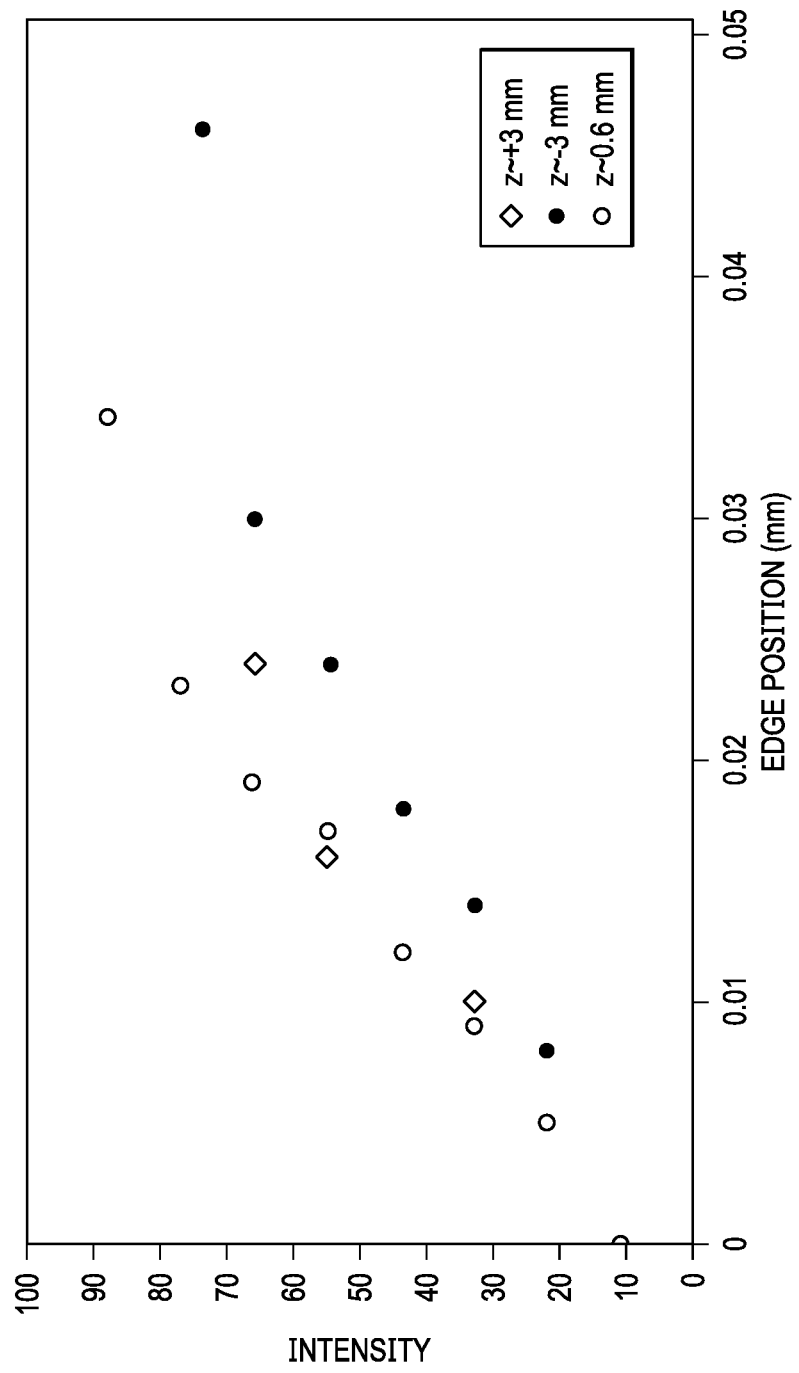
FIG. 5 shows measured reflected intensity readings (the y-axis in the plot) using arbitrary units at different knife edge z-axis edge positions (x-axis in the plot shown as 'edge position; in mm) thus being at different positions along the OA (z-axis direction) of a dual-optical displacement sensor system. There are three different knife edge positions reported as z with respect to the COR (+ being closer to the head and − being farther from the head, the positions shown as z=3 mm, z=−3 mm, and z=0.6 mm).

The Examples section provides a disclosed alignment algorithm that can be repeated to provide beam alignment as many times as deemed necessary. It is noted that the need to do this more than once is because generally when changing the angle, there is a translational movement of the head as well which is accounted for in the disclosed algorithm. There may be errors, that may not be fully accounted for. Accordingly, one reason to perform this iteratively is that there may be user' error. The intensity response to alignment is shown in FIG. 5 described below. By following this above-described procedure, it is possible to automatically instruct a basically unskilled user of a dual-optical displacement sensor system to align the OAs of the respective beams of the system.

Once the OAs have been aligned, a disclosed alignment arrangement can also be employed to monitor the beam alignment. Thermal expansion on the C- or O-frame, or unexpected mechanical forces can make the heads go out of alignment. Generally, one can perform standardization measurements with a disclosed alignment arrangement approximately every 20 minutes. It is possible to measure the optical displacement sensor OA misalignment at this time and compare the measured the OA misalignment to threshold values comprising a maximum x value, a maximum y value, and a maximum angle value. If any of these three thresholds is exceeded by the measured misalignment, then an alarm can be raised notifying the user that inaccurate measurements are likely if the alignment of the heads is not adjusted.

Disclosed aspects also include application to dual-optical displacement sensor systems which have heads which instead of providing a single beam as described above, instead include a plurality of pinholes for providing a plurality of separate beam spots, such as each having four pinholes in a square grid. The alignment principle is essentially the same, the alignment targets are the same, including the same single measurement pass, modified only to provide data for the plurality of pinholes. In this disclosed aspect, each of the first head includes a first plurality of pinholes and the second head includes a second plurality of pinholes, each of the grids for providing a plurality of separate beam spots, and the method can further comprise further comprises generating information in a single pass to direct rotating one of the first r head and the second head about its OA such that the first grid aligns with the second grid, and wherein the adjusting the position further comprises rotationally aligning the first grid to the second grid.

Therefore, in practice, the main addition to this disclosed aspect is that the respective grids comprising a plurality of pinholes need to be aligned rotationally. That is one of the heads is twisted so that the grid of pinholes for the first and the second heads are on the same plane. After the rotation alignment is completed to align the grid of the first and second heads, the alignment can be performed by averaging the alignment moves needed for all of the pinholes.

Thus, instead of having one pinhole to provide one beam in each of the heads, that heads can include a plurality of pinholes to provide a plurality of beam spots. If the pinholes are closely spaced, and are in the same plane (perpendicular to the OA), the same optics can be used to detect distances from the head for each pinhole. With such a setup in the case of a grid having four pinholes per head, one can select the best two or three pinholes to base a measurement on (such as the two measurements in the middle of the range). This adds the complication that all the pinholes need to be aligned to correspond to the pinholes in the other head.

It is recognized if the optics are chosen correctly, the spacing of the plurality of pinholes will remain constant with z, and therefore the spacing of the plurality of pinholes in one head will match that from the other head. If that is true, then the positions of all the pinholes from the respective heads (e.g., eight pinholes) can be determined in a plane. The next step is to rotate one head about its OA so that its pinholes coincide with the pinholes in the other head. This can be fairly easily calculated as a line through two adjacent points from one head which can be found, and then a line through two adjacent points from the other head, and the angle calculated between them. Instructions for this alignment procedure can be provided on a display screen for an operator.

Examples

Disclosed aspects of the invention are further illustrated by the following specific Examples, which should not be construed as limiting the scope or content of this Disclosure in any way.

FIG. 5 shows measured reflected intensity readings (y-axis on the data plot) at different positions (shown as edge position in mm) along the OA corresponding to the alignment target arrangement shown in FIG. 4A. The 3 positions shown are reported as z with respect to the COR (+z being closer to the head and −z being further from the head). With no knife edge in the beam path the intensity is <10. With any of the knife edges fully in place in the beam path due to reflection from the knife edge the measured intensity reading is >80. Therefore, the OA is where the reading is ~45 (being the average of the two readings; as this ½ way through the beam). This spot size for the beam from the confocal head was ~40 microns.

Regarding how to use intensity versus position data such as in FIG. 5 to align the OA of respective beams from first and second heads, one can mathematically define two lines (one for each head) which represent the OA of the respective head. The goal is to make these lines more co-linear by rotating and moving one or both of the heads. The Example section below describes calculating movements necessary to render the OAs of the beams co-linear that can be used to assist an operator with the beam alignment.

Below is an example head alignment assist for an operator, that may be implemented in MATLAB code, used to calculate movement necessary to make the respective OAs of the beams co-linear. Using data such as shown in FIG. 5, an equation of a line can be determined for each head which represents the OA of the head. These lines are compared to an ideal line. From this comparison, needed movements of the head(s) in the x direction (such as 1.5 mm), y direction (such as 2.7 mm) and the angle (such as 1.1°) are determined. An operator can then use those movement values for moving the head(s) to align the respective OAs. In one arrangement, as described above one head is moved to correct the alignment in the y-direction, and one head is moved to correct the alignment in the y-direction. The angle generally needs to be adjusted in two dimensions. The angle adjustments may be performed with precision screw with a Vernier indicator denominated in mm for example. The conversion between angle and the scale reading is generally input into the system so that the user would be told to move the screw, such as to move the screw 0.xxx mm, where x indicates a number 1 to 9.

While various disclosed aspects have been described above, it should be understood that they have been presented by way of example only, and not as a limitation. Numerous changes to the disclosed aspects can be made in accordance with the Disclosure herein without departing from the spirit or scope of this Disclosure. Thus, the breadth and scope of this Disclosure should not be limited by any of the above-described aspects. Rather, the scope of this Disclosure should be defined in accordance with the following claims and their equivalents.

The invention claimed is:

1. An optical alignment system for a dual-optical displacement sensor including a scanner comprising a first scanner head including a first optical displacement sensor for providing a first beam having a first optical axis (OA) extending substantially in a first direction and a second scanner head including a second optical displacement sensor for providing a second beam having a second OA extending substantially in the first direction, comprising:
    at least one alignment target, each alignment target comprising an integrally-formed knife edge pair including a first knife edge and a second knife edge offset from the first knife edge in the first direction, wherein the at least one alignment target is oriented along a first plane that is essentially perpendicular to the first direction and positioned between the first scanner head and the second scanner head for interacting with the first beam and the second beam;
    a photodetector in at least one of the first and second scanner head for collecting time versus position data comprising from measurements involving the alignment target in a path of the first beam and measurements involving the alignment target in a path of the second beam path, and
    a computing device or a programmed circuit implementing at least one equation coupled to receive and analyze the time versus position data for determining a degree of alignment of the first OA relative to the second OA.

2. The optical alignment system of claim 1, wherein the at least one alignment target comprises a first alignment target and a second alignment target that are both one-piece structures which are both oriented along different parallel planes that are each parallel to the first plane, and wherein the first alignment target and the second alignment target each include the knife edge pair, and wherein the first knife edge and the second knife edge for the knife edge pairs are both angled between 50 and 125 degrees relative to one another.

3. The optical alignment system of claim 1, wherein the optical alignment system is configured for automatically implementing adjusting a position of at least one of the first scanner head and the second scanner head so that the first OA and the second OA become more co-linear.

4. The optical alignment system of claim 1, wherein the optical alignment system is configured for providing instructions for a user adjusting a position of at least one of the first scanner head and the second scanner head so that the first OA and the second OA become more co-linear.

5. The optical alignment system of claim 1, wherein the first and the second optical displacement sensors both comprise chromatic confocal sensors, and wherein the measurements are reflection measurements.

6. The optical alignment system of claim 1, wherein the first and the second optical displacement sensors both comprise laser triangulation sensors.

7. The optical alignment system of claim 1, wherein the essentially perpendicular comprises an angle is between 85 degrees and 95 degrees relative to the first and the second OA.

8. A method of aligning a dual-optical displacement sensor system including a scanner comprising a first scanner head including a first optical displacement sensor for providing a first beam having a first optical axis (OA) extending substantially in a first direction, and a second scanner head including a second optical displacement sensor for providing a second beam having a second OA extending substantially in the first direction, comprising:
    positioning at least one alignment target providing an integrally-formed first knife edge pair including a first knife edge and a second knife edge offset from the first knife edge in the first direction, the at least one alignment target oriented along a first plane that is essentially perpendicular to the first OA and the second OA and positioned between the first scanner head and the second scanner head for interacting with the first beam and the second beam;
    collecting time versus position data by performing first measurements involving the at least one alignment target in a beam path along the first OA and second measurements involving the at least one alignment target in a second beam path along the second OA;
    from the time versus position data using at least one equation, determining a degree of alignment of the first OA relative to the second OA, and
    adjusting a position of at least one of the first scanner head and the second scanner head so that the first OA and the second OA become more co-linear.

9. The method of claim 8, further comprising periodically performing the method to redetermine the degree of alignment, and then repeating the adjusting.

10. The method of claim 8, wherein the adjusting comprises a computing device or a programmed circuit automatically implementing the alignment.

11. The method of claim 8, wherein the at least one alignment target comprises a first alignment target and a second alignment target that are both one-piece structures which are oriented along different parallel planes that are each oriented in the first plane, and wherein the first alignment target and the second alignment target each include a knife edge pair, and wherein including the first knife edge and the second knife edge for the knife edge pairs that are at an angle between 50 and 125 degrees relative to one another.

12. The method of claim 8, further comprising:
    removing the alignment target from between the first and the second scanner heads,
    the scanner moving the first and the second scanner heads over a coated sheet material comprising a coating layer on a metal substrate, and
    measuring at least one thickness for the coated sheet material.

13. The method of claim 8, wherein the coating layer includes a top coating layer and a bottom coating layer, and wherein the first scanner head is positioned to be a top head for measuring a thickness of the top coating layer and the second scanner is positioned to be a bottom head for measuring a thickness of the bottom coating layer.

14. The method of claim 8, wherein the adjusting comprises instructions for the alignment that guides steps for a user for manually implementing the alignment.

15. The method of claim 8, wherein the at least one alignment target consists of a single alignment target providing the first knife edge pair, further comprising repositioning the single alignment target in a direction along the first OA and the second OA to provide an effect of having both a first knife edge pair and a second knife edge pair.

16. The method of claim 8, wherein the first head includes a first grid including a first plurality of pinholes and the second head includes a second grid including a second plurality of pinholes, the first and second grids for providing a plurality of separate beams, and wherein the method further comprises generating information in a single pass to direct rotating one of the first scanner head and the second scanner head about its OA such that the first grid aligns with the second grid, and wherein the adjusting the position further comprises rotationally aligning the first grid to the second grid.

17. The method of claim 8, wherein during the collecting time versus position data at certain times the first beam is on while the second beam is off, and during other times the second beam is on while the first beam is off.

18. A dual-optical displacement sensor system, comprising:
    a scanner comprising a first scanner head including a first optical displacement sensor for providing a first beam having a first optical axis (OA) extending substantially in a first direction and a second scanner head including a second optical displacement sensor for providing a second beam having a second OA extending substantially in the first direction, and
    a computing device or programmed circuit configured to:
        receive time versus position data from first measurements involving a first alignment target comprising an integrally-formed first knife edge pair including a first knife edge and a second knife edge offset from the first knife edge in the first direction, and a second measurement involving a second alignment target comprising an integrally-formed second knife edge pair including a third knife edge and a fourth knife edge offset from the third knife edge in the first direction wherein the first alignment target is oriented along a first plane that is essentially perpendicular to the first direction and the second alignment target is oriented along a second plane parallel to the first plane;
        analyze using at least one equation the time versus position data for determining a degree of alignment of the first OA relative to the second OA, and
        an algorithm for automatic alignment of the first OA relative to the second OA using the degree of alignment, or provide assist instructions for a user implemented alignment of the first OA and the second OA using the degree of alignment that provides guiding steps for the user for implementing the alignment.

19. The dual-optical displacement sensor system of claim 18, wherein the dual-optical displacement sensor system includes the algorithm for automatic alignment of the first OA relative to the second OA.

20. The dual-optical displacement sensor system of claim 18, wherein the first and the second optical displacement sensor both comprise a chromatic confocal displacement sensor, and wherein the measurements comprise reflection measurements.

\* \* \* \* \*